No. 891,621. PATENTED JUNE 23, 1908.
A. KÖNIG.
SIGHTING INSTRUMENT.
APPLICATION FILED OCT. 4, 1907.

UNITED STATES PATENT OFFICE.

ALBERT KÖNIG, OF JENA, GERMANY, ASSIGNOR TO THE FIRM OF CARL ZEISS, OF JENA, GERMANY.

SIGHTING INSTRUMENT.

No. 891,621.

Specification of Letters Patent.

Patented June 23, 1908.

Application filed October 4, 1907. Serial No. 395,909.

*To all whom it may concern:*

Be it known that I, ALBERT KÖNIG, a citizen of the German Empire, and residing at Carl-Zeiss strasse, Jena, in the Grand Duchy of Saxe-Weimar, Germany, have invented a new and useful Sighting Instrument, of which the following is a specification.

The invention relates to sighting instruments on stands, tripods or the like, and particularly to such of these instruments, as have the carrier of the instrument proper rotatable by worm gearing in the vertical sighting plane and are provided with a scale at the worm to measure small angles above and below the horizontal, *i. e.*, the angles of elevation or depression of the objects sighted.

The object of the invention is to simplify these instruments, so that appliances for rendering the bearing of the said carrier or the head of the stand, on which this bearing rests, horizontal in the sighting plane are dispensed with. This object is attained by arranging a tubular spirit level on the carrier or on the instrument itself parallel to the sighting line and making either the scale arranged at the worm or its index independently rotatable about the axis of the worm. Instead of leveling the bearing of the carrier in the sighting plane, the instrument is rendered available for measuring the angle of elevation or depression by bringing the level first of all into play through rotation of the worm and thereupon rotating the scale or the index until the horizontal mark on the scale is indicated.

The new arrangement is still advantageously applicable, when, for the purpose of increasing the angle which can be measured, besides a scale of full circuit at the worm a second scale co-axial with the worm wheel, is employed, the intervals of which correspond each to the full circuit of the first scale.

Figure 1:
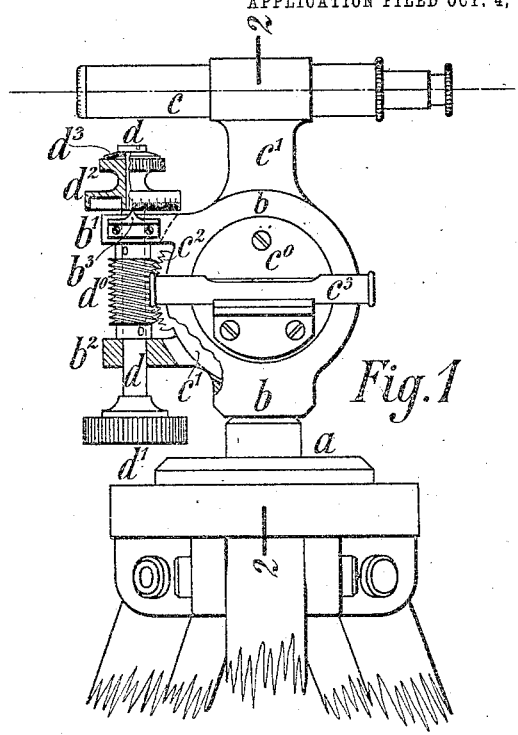
Figure 2:
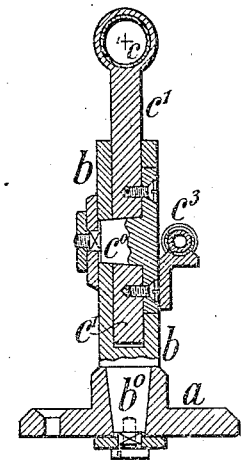
Figure 3:
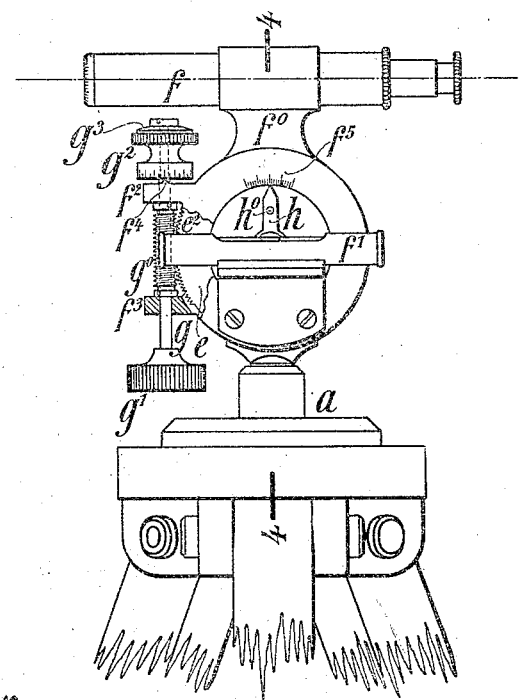
Figure 4:
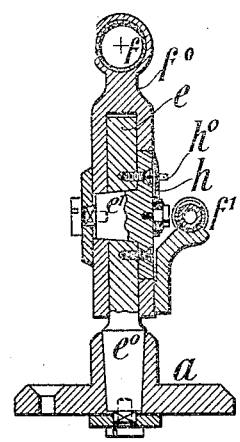

In the annexed drawing: Figure 1 is a side elevation of a sighting instrument constructed according to the invention. Fig. 2 is a vertical section along the line 2—2 of Fig. 1. Fig. 3 is a side elevation of another instrument. Fig. 4 is a vertical section along the line 4—4 of Fig. 3.

In the example shown in Figs. 1 and 2 there is only one scale. In the head $a$ of the stand the forked bearing $b$ is rotatable by means of the vertical pivot $b^0$. In this bearing the carrier $c^1$ of the sighting telescope $c$ with its screw attached axle $c^0$ is accommodated. The prongs of the forked bearing have on one side two arms $b^1$ and $b^2$, in which the shaft $d$ of the worm $d^0$ is supported. A lateral enlargement $c^2$ of the carrier $c^1$ is developed as a worm wheel sector. The worm shaft $d$ carries at one end the milled head $d^1$ and at the other end facing the index $b^3$ a knob with scale $d^2$. This knob is loosely held on its shaft $d$ by the washer $d^3$. The tubular spirit level $c^3$ is fixed on the axle $c^0$ of the carrier parallel to the line of sight of the telescope $c$. The relative adjustment of the parts of the instrument as represented (with horizontal line of sight) is accomplished by bringing the level into play and thereupon rotating the scale $d^2$ about its shaft $d$ until the index $b^3$ points to the horizontal mark. The approximate vertical position of the plane of rotation of the carrier $c^1$ can be obtained by suitably altering the set up of the stand judging by the eye, if, as represented on account of simplicity, the bearing $b$ be unprovided with a tubular spirit level parallel to the axis of the bearing.

The second example, Figs. 3 and 4, makes use of a simple bearing body $e$, which is in this case also rotatable in the stand head $a$ about a vertical pivot $e^0$. Differing from the first example, the carrier $f^0$ of the telescope $f$ is forked and directly carries the level $f^1$, while the axle $e^1$ is screwed on to the bearing $e$. The worm wheel sector $e^2$ is a part of the bearing $e$, consequently non-rotatable, and the shaft $g$ of the worm $g^0$ is supported in the arms $f^2$ and $f^3$ of the carrier $f^0$, it turns consequently with this carrier about the axle $e^1$. The milled head $g^1$ and the rotatable scale $g^2$ are adapted as the corresponding parts in the first example, the scale being under the yielding pressure of the washer $g^3$ and facing the index $f^4$. To the scale $f^5$ on the carrier $f^0$ an index $h$ corresponds which is adapted to rotate on the pivot $e^1$ and whose pin $h^0$ presents a handle for adjustment purposes. The position of the parts represented is again that of being ready for taking measurements and is brought about by bringing the level into play and adjusting the scale $g^2$ and the index $h$ until the horizontal marks are pointed to.

Each telescope is to be considered a sighting telescope, in which a line of sight is determined by a mark in the image field. As such mark a conspicuous point on the margin of the diaphragm of the field of view (for instance, the lowest or the highest point) may suffice for the present purpose.

I claim:

1. In a stand sighting instrument the combination, with the carrier of the instrument proper, of a worm gearing adapted to rotate the carrier in the vertical sighting plane, a circular scale co-axial to the worm, an index for this scale and a tubular spirit level carried by the carrier parallel to the line of sight, the scale and the index being adjustable relatively to each other and independently of the worm movement.

2. In a stand sighting instrument the combination, with the carrier of the instrument proper, of a worm gearing adapted to rotate the carrier in the vertical sighting plane, a circular scale co-axial to the worm, an index for this scale, an arc scale co-axial to the worm wheel, an index for this second scale and a tubular spirit level carried by the carrier parallel to the line of sight, the circular scale and its index being adjustable relatively to each other and independently of the worm movement, and the divisions of the arc scale corresponding each to a full circle of the first scale.

ALBERT KÖNIG.

Witnesses:
PAUL KRÜGER,
FRITZ SANDER.